(12) United States Patent
Kasper (10) Patent No.: US 6,307,835 B1
(45) Date of Patent: Oct. 23, 2001

(54) METHOD AND APPARATUS FOR CONTROLLING DATA FLOW IN DATA COMMUNICATION NETWORKS

(75) Inventor: Christian D. Kasper, Carrollton, TX (US)

(73) Assignee: STMicroelectronics, Inc., Carrollton, TX (US)

( * ) Notice: Subject to any disclaimer, the term of this patent is extended or adjusted under 35 U.S.C. 154(b) by 0 days.

(21) Appl. No.: 09/113,850

(22) Filed: Jul. 10, 1998

(51) Int. Cl.[7] ................................ G01R 31/08; H04J 3/22
(52) U.S. Cl. ........................ 370/229; 370/235; 370/470
(58) Field of Search ................................. 370/231, 235, 370/415, 470, 465, 476, 472, 498, 229, 468

(56) References Cited

U.S. PATENT DOCUMENTS

| | | | |
|---|---|---|---|
| 4,103,336 | * | 7/1978 | Gindi et al. ........................ 364/900 |
| 4,380,063 | * | 4/1983 | Janson et al. ........................ 370/60 |
| 5,007,051 | * | 4/1991 | Dolkas et al. ........................ 370/85.1 |
| 5,048,012 | * | 9/1991 | Gulick et al. ........................ 370/77 |
| 6,058,251 | * | 5/2000 | Okamato et al. ........................ 395/287 |

* cited by examiner

*Primary Examiner*—Alpus H. Hsu
*Assistant Examiner*—Duc Ho
(74) *Attorney, Agent, or Firm*—Lisa K. Jorgenson; Christopher F. Regan (57) ABSTRACT

A method and apparatus for controlling data flow of data communications in a network are provided. A method preferably includes dynamically varying a minimum frame slot number, transmitting at least bytes of data from a frame of data of a slot, and determining the end of the frame of data. The method also preferably includes determining that the number of bytes of data within the frame is less than the current minimum frame slot number and transmitting flag bytes within the slot until the combination of the number of bytes and flag bytes equals the current minimum frame slot number. An apparatus preferably includes a transmitter for transmitting at least bytes of frames of data of a data slot, a byte counter responsive to the transmitter for counting the number of bytes in a frame of transmitted data, and a flag counter responsive to the transmitter for counting the number of flag bytes transmitted within a frame of transmitted data. The apparatus also preferably includes a byte counter comparator responsive to the byte counter for comparing the number of bytes transmitted in each frame of data with a predetermined minimum frame slot number and a counter sum comparator for comparing the sum of the number in the byte counter and the number in the flag counter with the predetermined frame slot number.

37 Claims, 7 Drawing Sheets

METHOD AND APPARATUS FOR CONTROLLING DATA FLOW IN DATA COMMUNICATION NETWORKS

FIELD OF THE INVENTION

The invention relates to the field of data communications and, more particularly, to the field of network data communications.

BACKGROUND OF THE INVENTION

Figure 1:
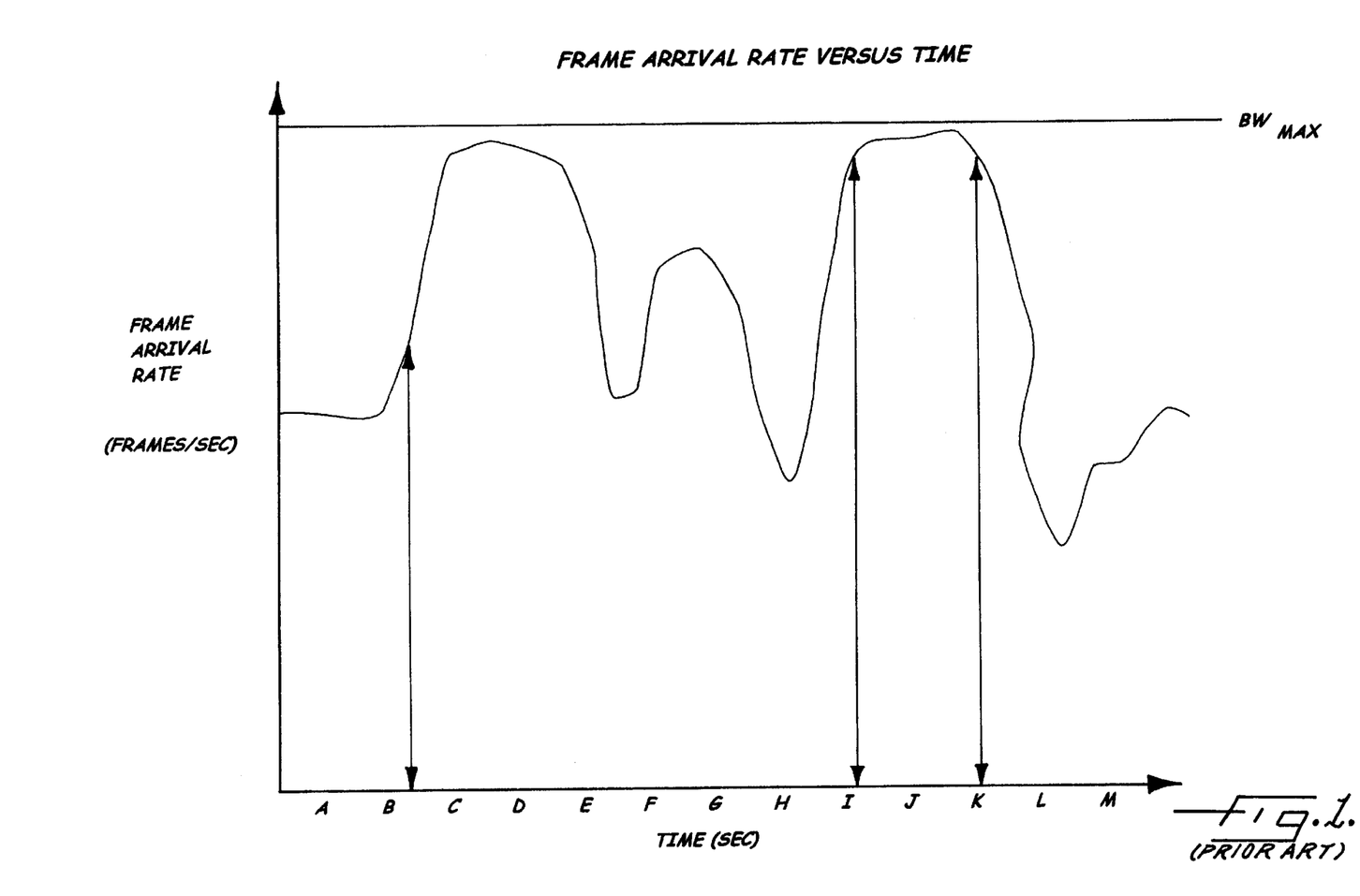
FIG. 1 is a graph of frame arrival rate versus time which illustrates the self-similar characteristic of peaks and valleys at consistently diminishing time intervals according to the prior art.

In general network traffic on a data communications network has been described as bursty or fractal in nature. The volume of traffic if examined over time shows the self-similar characteristic of peaks and valleys at consistently diminishing time intervals (see, e.g., FIG. 1 where $BW_{MAX}$ is the maximum bandwidth). In other words, the network sustains periods of high traffic and low traffic. Additionally, even smaller intervals of time than those illustrated in FIG. 1 can also be generally described as fractal or bursty as well. Modeling or designing hardware to handle the bandwidth requirements of this sort of bursty traffic has been fraught with difficulties. In general attempts to control the rate of frame transmission have had a depressing effect upon the overall channel bandwidth. An entire taxonomy of schemes exist to handle flow-control, from transmit windowing, and relatively recently, in-band communication of transmit delay timers, to creation of minimum frame sizes.

Figure 2:
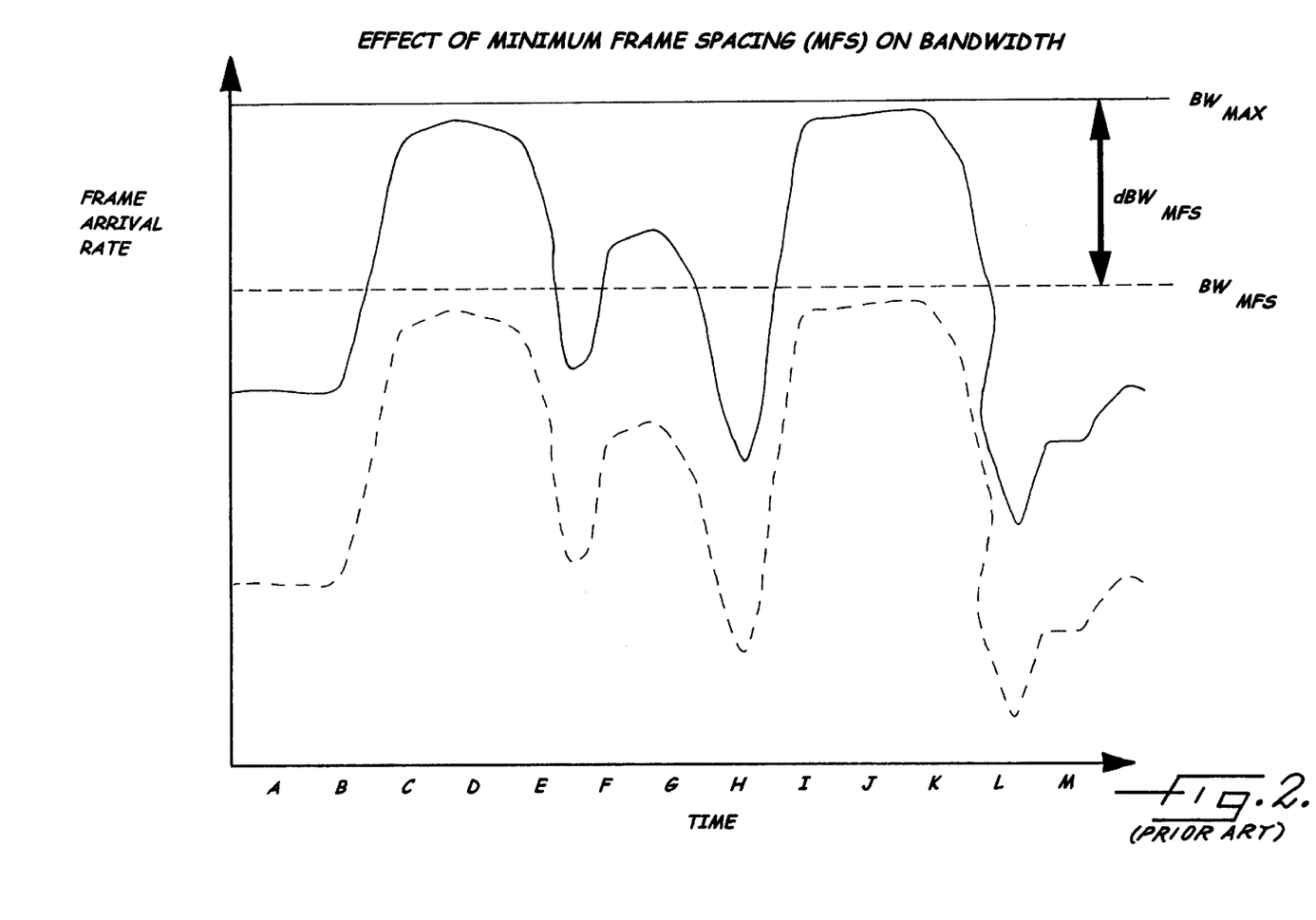
FIG. 2 is a graph of frame arrival rate versus time which illustrates the effect of minimum frame spacing on bandwidth according to the prior art.

For example, a minimum frame spacing ("MFS") scheme has a purpose or intent of delaying transmission by stuffing a fixed number of flag bytes between successive data frames or slots. A problem with implementing MFS with this type of traffic is that although it successfully dampens the transmit rate, this scheme does so indiscriminately. All frames are padded with flags whether or not they need to be padded (see, e.g., FIG. 2 wherein $BW_{MFS}$ is the bandwidth using the minimum frame spacing scheme and $dBW_{MFS}$ is the bandwidth difference or change between the maximum bandwidth). The net effect is to reduce the overall effectiveness of the device and waste bandwidth.

Another example can be seen in the Institute for Electrical and Electronic Engineers ("IEEE") specification no. 802.3 which requires frames smaller than 64 bytes to be padded with sufficient bytes such that this minimum frame size is satisfied:

The number of extra bits shall be sufficient to ensure that the frame, from the destination address field through the FCS field inclusive, is at least minFrameSize bits. The content of the pad is unspecified. (IEEE 802.3, p. 21).

Additionally, the IEEE 802.3z committee recently introduced a concept called "Carrier Extension" as set forth below:

In half-duplex mode at operating speeds above 100 Mb/s ... appending non-data symbols, referred to as extension bits, to frames which are less than minFrameSize+ extendSize bits in length so that the resulting transmission is at least one slotTime in duration.

The IEEE implementations, however, are fixed on 64 bytes as a minimum frame size. The IEEE 802.3 specification requires that padding be inserted into the interior of the frame, that is, between the data and FCS fields. The IEEE 802.3z committee development is an attempt to avoid increasing the minimum Ethernet frame size by increasing the minimum slot-time for gigabit Ethernet to 4 k bit times which is again a hard constant.

SUMMARY OF THE INVENTION

In view of the foregoing background, the present invention advantageously provides a method and apparatus for more effectively controlling the data flow in data communication networks. The present invention also advantageously provides a method and apparatus which is dynamic, relatively simple, and has no absolute minimum frame size for data flow in a data communications network. The present invention additionally advantageously provides a method and apparatus which flexibly and effectively guarantee a maximum arrival rate for a downstream node in a data communications network. The present invention further provides a method and apparatus which reduces or prevents buffer overflow errors and lost frames due to sudden or even extended bursts of small frames in a data communications network.

More particularly, the present invention provides a variable frame padding ("VFP") method and apparatus in which a host data communications terminal is free to change the minimum frame threshold at any time and thereby throttle up or down the transmit traffic. If the length of a frame is found to be under the minimum frame threshold or slot value then pad or flag bytes are inserted preferably after the frame's CRC field has been successfully transmitted. Sufficient flags are issued or inserted until the threshold or slot value has been reached. A downstream node of a data communications network advantageously receives the benefit of padding because it has the responsibility of keeping up with an upstream node of the data communications network. Because the rate of frame arrival is inversely proportional to frame size, the downstream node must work proportionately harder as the average arriving frame decreases proportionately in length.

If the transmitting node is forced to observe a minimum frame size such that all frames smaller than this value are extended in length, then a maximum arrival rate for the downstream node can be effectively guaranteed. In this way, the receiving node also can be insured against buffer overflow errors and lost frames due to sudden or even extended bursts of small frames. Because any frames exceeding this minimum frame threshold value are ignored, bandwidth utilization is only marginally affected. The method of the present invention is advantageously quite simple yet its effect can be powerful.

More particularly, a method of controlling data flow of data communications in a network is provided which preferably includes dynamically varying a minimum frame slot number and transmitting at least bytes of data from a frame of data of a slot. The method can also include determining the end of the frame of data, determining that the number of bytes of data within the frame is less than the current minimum frame slot number, and transmitting flag bytes within the slot until the combination of the number of bytes and flag bytes equals the current minimum frame slot number.

Another aspect of a method of controlling data flow of data communications in a network, more specifically, preferably includes: (a) transmitting at least one byte of data from a frame of data within a frame slot;(b) incrementing a byte counter from a current setting; (c) if an end of the frame of data does not occur, then repeat steps (a) and (b) for the frame; and (d) if an end of the frame of data occurs, then determining whether a number currently represented and stored in the byte counter is less than a predetermined minimum frame slot number. The method can also preferably include the steps of (e) if the number currently represented and stored in the byte counter is less than the predetermined minimum frame slot number, then transmitting a flag byte and incrementing a flag byte counter from a current setting;(f) if the number currently represented and stored in the byte counter is equal or greater than the minimum frame slot number, then resetting the byte and flag counters and repeating steps (a) through (e); (g) if the sum of the numbers currently represented and stored in the byte and flag counters does not equal the predetermined minimum frame slot number, then repeat steps (e) and (f); and (h) if the sum of the numbers currently represented and stored in the byte and flag counters equals the predetermined minimum frame slot number, then resetting the byte and flag counters to an initial setting and repeat steps (a) and (b) for another frame of data.

An apparatus for network data communications is also provided according to the present invention. The apparatus preferably includes transmitting means for transmitting at least bytes of frames of data of a data slot and counting means responsive to the transmitting means for counting the number of bytes and the number of flag bytes in a frame of a slot of transmitted data. The apparatus also preferably includes comparing means responsive to the counting means for comparing the number of bytes transmitted in each frame of data with a predetermined minimum frame slot number and for comparing the sum of the number of bytes and the number of flag bytes in the counting means with a predetermined minimum frame slot number. The apparatus can further advantageously include a frame slot recorder for recording a minimum frame slot number for each desired slot size of data to be transmitted and a frame slot verifier responsive to the frame slot recorder for verifying the minimum frame slot number for each desire slot size.

According to additional aspects of the present invention, an apparatus for network data communications is provided which preferably includes a transmitter positioned to transmit at least bytes of frames of data of a data slot, a byte counter responsive to the transmitter to count the number of bytes in a frame of transmitted data, and a flag counter responsive to the transmitter to count the number of flag bytes transmitted within a frame of transmitted data. The apparatus also preferably includes a byte counter comparator responsive to the byte counter to compare the number of bytes transmitted in each frame of data with a predetermined minimum frame slot number and a counter sum comparator responsive to the byte and flag counters for comparing the sum of the number in the byte counter and the number in the flag counter with the predetermined frame slot number. The apparatus can further advantageously include a frame slot recorder for recording a minimum frame slot number for each desired slot size of data to be transmitted and a frame slot verifier responsive to the frame slot recorder for verifying the minimum frame slot number for each desire slot size.

BRIEF DESCRIPTION OF THE DRAWINGS

Some of the features, advantages, and benefits of the present invention having been stated, others will become apparent as the description proceeds when taken in conjunction with the accompanying drawings in which.

DETAILED DESCRIPTION OF PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Prime or multiple prime notation where used indicates alternative embodiments. Like numbers refer to like elements throughout.

Figure 3:
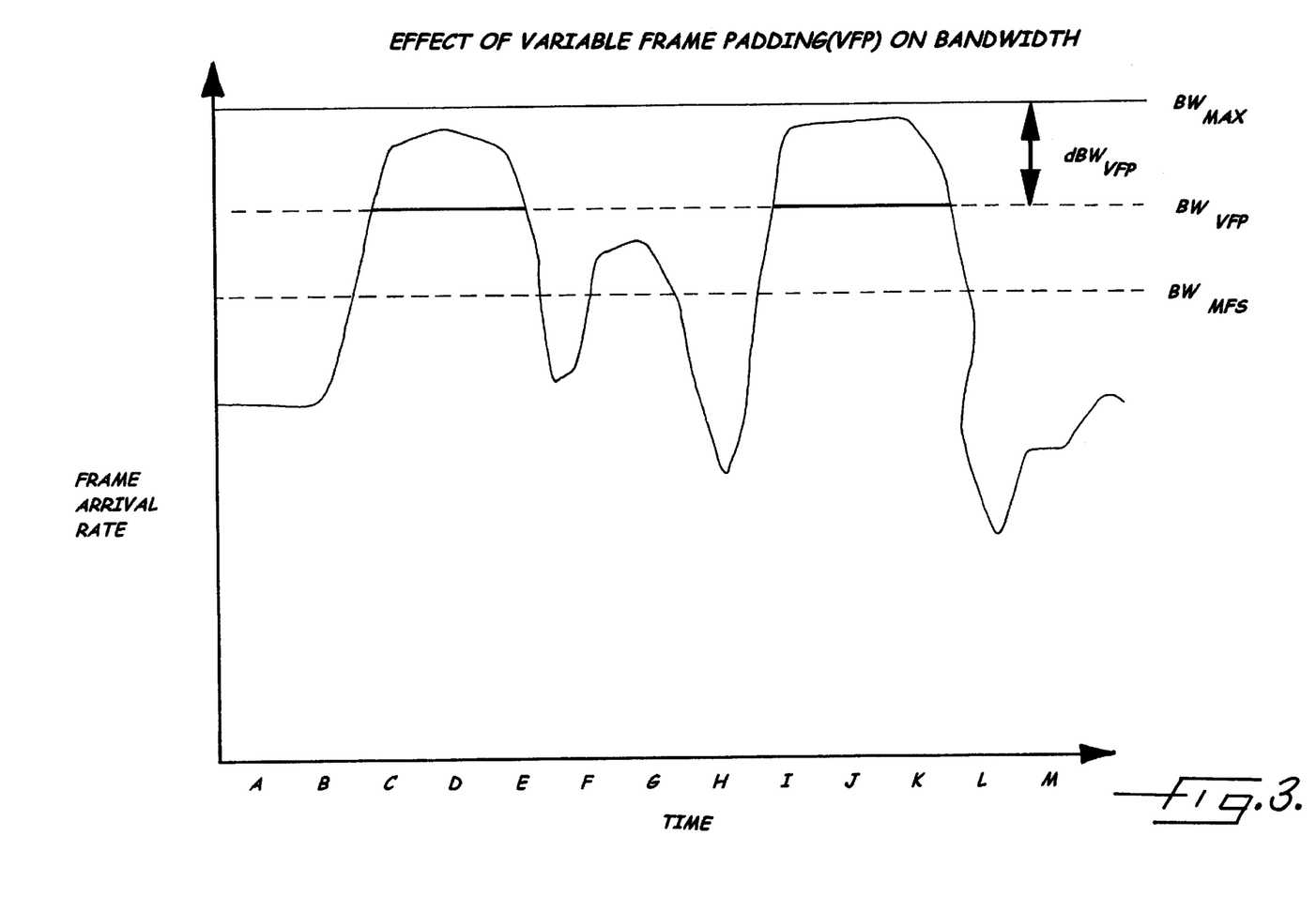
FIG. 3 is a graph of frame arrival rate versus time which illustrates the effect of variable frame padding on bandwidth according to a method and apparatus of the present invention.
Figure 4:
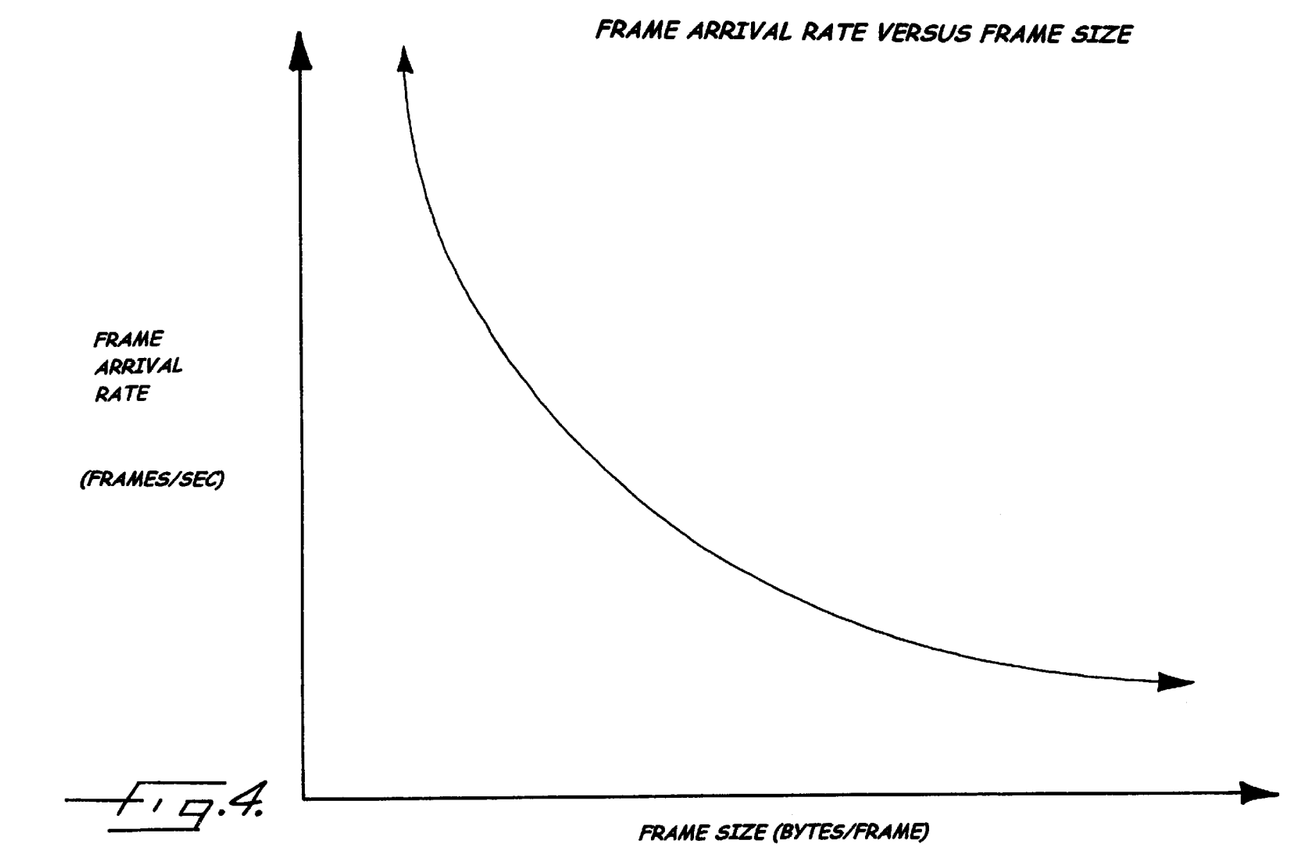
FIG. 4 is a graph of frame arrival rate versus frame size which illustrates that the rate of frame arrival is inversely proportional to frame size as recognized by the method and apparatus for controlling data flow of data communications in a network according to the present invention.

FIG. 3 is a graph which illustrates the effect of variable frame padding ("VFP") on bandwidth according to a method and apparatus of the present invention and where $BW_{VFP}$ is the bandwidth of the VFP and $dBW_{VFP}$ is the difference or change between the maximum bandwidth. As illustrated, the VFP scheme of the present invention advantageously flattens out peaks to show that below a selected parameter, e.g., a slot value, traffic will not be effected. FIG. 4 illustrates the recognition by the present invention that the rate of frame arrival is inversely proportional to frame size. This, in essence, means that the downstream node must work proportionately harder as the average arriving frame decreases proportionately in length. In order to better control flow of data in a data communications network, the present invention provides a VFP method of controlling data flow of data communications in a network as perhaps best illustrated in FIGS. 3 and 5. The method preferably includes recording a minimum frame slot number or value for data and verifying the recorded minimum frame slot number (Block 22) which, for example, is preferably set and can be an integer value such as having a function of a power of 2 or power of 4 as understood by those skilled in the art.

Figure 5:
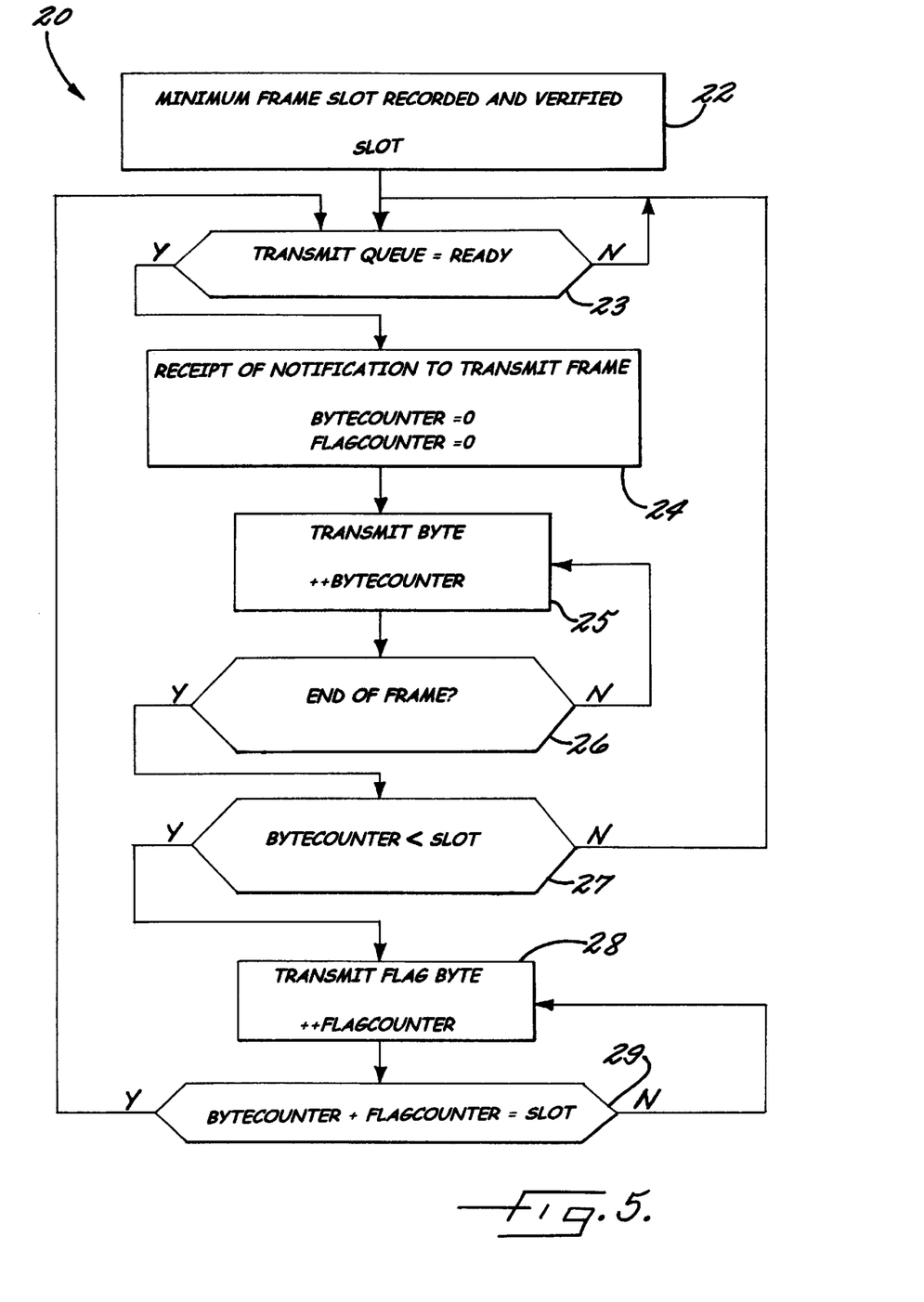
FIG. 5 is a flow diagram of a method of controlling data flow of data communications in a network according to the present invention.

As understood by those skilled in the art, a slot is generally defined as 512 bit times or 64 bytes. Accordingly, a slot will generally include 7 bytes of preamble, 1 byte of a starting frame delimiter, 6 bytes of destination, 6 bytes of source, 2 bytes of length/type field, 46 bytes of data, and 4 bytes of CRC. A frame generally will not include the preamble or the starting frame delimiter as understood by those skilled in the art. As described further herein, the frame padding or insertion of flag bytes preferably occurs after the preamble and starting frame delimiter, i.e., in the interior of the frame.

Also, according to the present invention, a byte counter and a flag counter are both provided and both have some initial setting such as zero. A transmit queue is checked or determined to be ready (Block 23), and receipt of notification to transmit a frame of data of a slot is determined or acknowledged (Block 24). At least one byte of data from a frame of data within a slot is transmitted (Block 25), and the byte counter is incremented or incrementally increased (Block 25).

The method also includes determining if the end of the frame of data occurs (Block 26). If the end of the frame of data does not occur, then another byte of data is transmitted and the byte counter incremented (Block 25). If the end of the frame of data occurs, then whether a number currently represented and stored in the byte counter is less than the minimum frame slot number is determined (Block 27). If the number currently represented and stored in the byte counter is less than the minimum frame slot number, then a flag byte is transmitted within the slot and the flag byte counter incremented (Block 28). If the number currently represented and stored in the byte counter is equal or greater than the minimum frame slot number, then the transmit queue is determined to be ready (Block 23), receipt of notification to transmit is determined (Block 24), and the byte and flag counters are reset to the initial settings (Block 24). The steps set forth above are then repeated until all of the desired transmissions occur or are complete.

If the number in the byte counter is less than the minimum frame slot, then whether the sum of the numbers currently represented and stored in the byte counter and the flag counter equals the minimum frame slot number is determined (Block 29). If the sum does not equal the minimum frame slot number, then another flag byte is transmitted and the flag counter incremented. If the sum equals the minimum frame slot, then the transmit queue is determined to be ready (Block 23), a receipt of notification to transmit a frame is determined ((Block 24), and the byte and flag counters are reset to an initial setting (Block 24). At least another byte of data of another frame is then transmitted (Block 25).

Advantageously, this VFP method of the present invention allows the minimum frame slot number or value to be dynamically varied or adjusted, e.g., by recording another minimum frame slot number or threshold value. A host data communications terminal is free to change the minimum frame threshold at any time and thereby throttle up or down the transmit traffic. In other words, the slot size can increase if congestion occurs and decrease on a trigger or threshold such as when a transmit window is increased. As understood by those skilled in the art, the increase of the window allows the frame arrival rate to be increased or improve performance and thereby allows the slot size to decrease. If the length of a frame is found to be under the minimum frame threshold or slot value then pad or flag bytes are inserted preferably after the frame's CRC field has been successfully transmitted. Sufficient flags are issued or inserted until the threshold or desired slot value has been reached. A downstream node advantageously receives the benefit of padding because it has the responsibility of keeping up with the upstream node.

If the transmitting node is forced to observe a minimum frame slot size such that all frames smaller than this value are extended in length, then a maximum arrival rate for the downstream node can be effectively guaranteed. In this way, the receiving node also can be insured against buffer overflow errors and lost frames due to sudden or even extended bursts of small frames. Bandwidth utilization is only marginally affected since any frames exceeding this minimum frame threshold value are ignored. The method of the present invention is advantageously quite simple yet its effect can be powerful.

Also, the method, as well as the apparatus, can also include a slot size learning mode. In such a mode, the slot size can be selected based upon an average slot size used over a selected period of time. Such a learning mode can advantageously enhance control of the communications by reducing wide swings or variations in slot sizes and thereby enhance performance of the apparatus.

As understood by those skilled in the art, the present method can be understood as a congestion control scheme and preferably of the open loop control type. Within the open loop control type this variable frame padding method of the present invention can also be understood as a source control type scheme of congestion control in which the source or transmitting of data communications is controlled to regulate congestion which may arise within the network. The source control can be either without or with feedback as understood by those skilled in the art.

Figure 6:
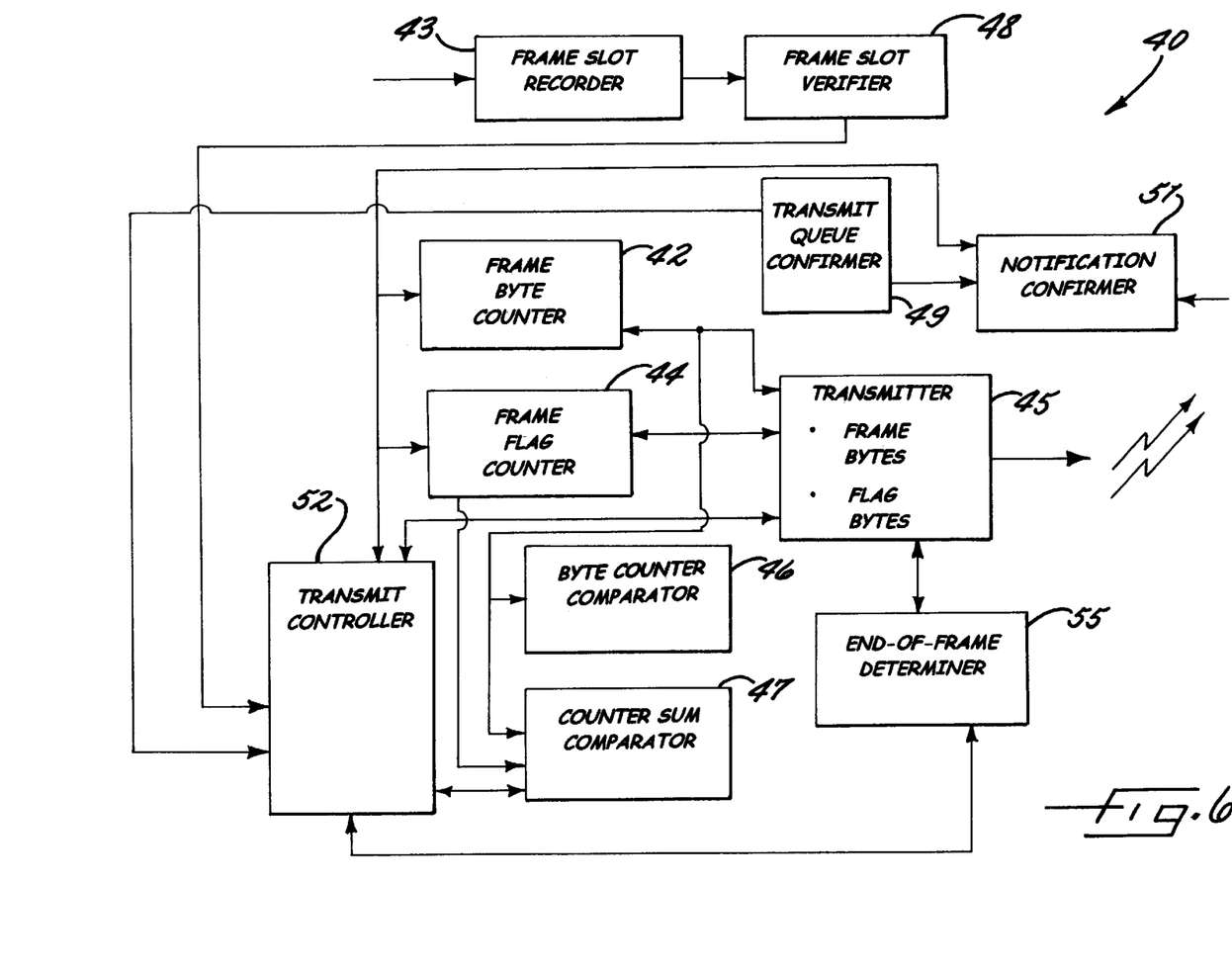
FIG. 6 is a schematic block diagram of an embodiment of an apparatus for controlling data flow of data communications in a network according to the present invention.
Figure 7:
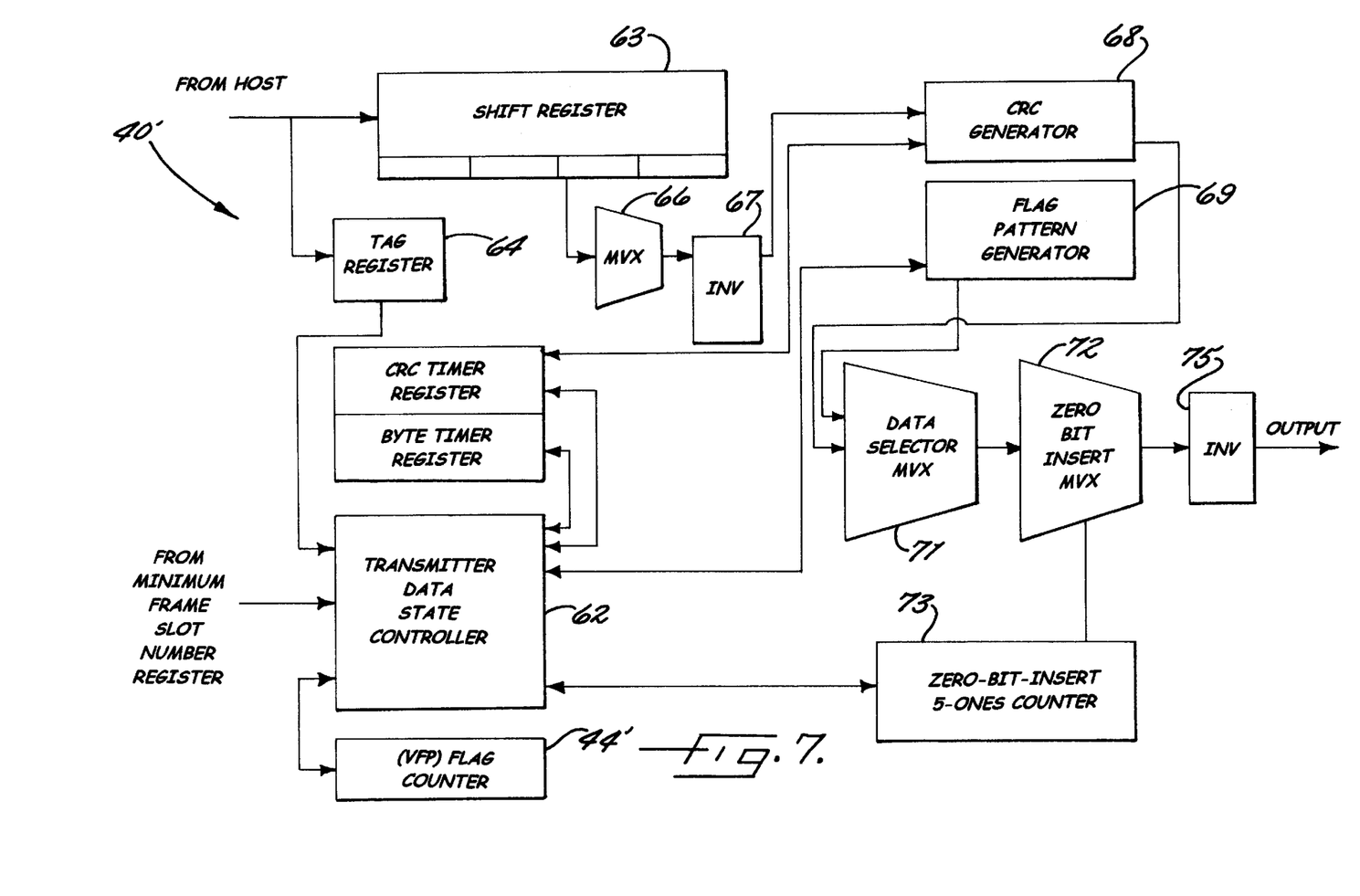
FIG. 7 is another embodiment of an apparatus for controlling data flow of data communications in a network according to the present invention.

FIGS. 6–7 perhaps best illustrate an apparatus 40 for controlling flow of data from a source in a data communications network according the present invention. The apparatus 40 preferably has transmitting means, e.g., preferably provided by a transmitter 45, for transmitting at least bytes of frames of data of a slot. Byte counting means, e.g., preferably provided by a byte counter 42, is responsive to the transmitter 45 for counting the number of bytes in a frame of transmitted data. Flag counting means, e.g., preferably provided by a flag counter 44, is responsive to the transmitter 45 for counting the number of flag bytes transmitted within a frame of transmitted data. The byte counter 42 and the flag counter 44, as understood by those skilled in the art, in combination define counting means which can be separate circuits, separate software routines or programs, a common circuit, and/or a common software routine or program.

The apparatus 40 also preferably has comparing means, e.g., preferably including a byte counter comparator 46, which is responsive to the byte counter 42 to compare the number of bytes transmitted in each frame of data with a predetermined minimum frame slot number. The comparing means also preferably includes a counter sum comparator 47 responsive to the byte and flag counters 42, 44 for comparing the sum of the number in the byte counter 42 and the number in the flag counter 44 with the predetermined frame slot number.

The apparatus can further include a frame slot recorder 43 for recording a minimum frame slot number for each desired slot size of data to be transmitted and a frame slot verifier 48 responsive to the frame slot recorder 43 for verifying the minimum frame slot number for each desire slot size. The frame slot verifier is also preferably connected to a transmit controller 52 as described further herein. A transmit queue confirmer 49 is preferably responsive to the recorder 48 for confirming the ready status of the transmitter 45. A notification confirmer 51 is responsive to the transmit controller 52 for confirming receipt of notification to transmit a frame of data. The apparatus can still further include an end of frame determiner 55 responsive to the transmitter 45 for determining the end of a frame of data. The byte counter comparator 46 is also responsive to the end of frame determiner 51. A transmit controller 52, e.g., forming portions of transmitting means, is preferably connected to and responsive to, the transmitter 45, the counters 42, 44, the notification confirmer 51, the comparators 46, 47, the frame slot verifier 48, and the end-of-frame determiner 55 for controlling the transmitter 45, including the data state of the transmitter 45.

FIG. 7 illustrates another embodiment of an apparatus 40' using a high-level data link controller ("HDLC"), as understood by those skilled in the art, as a transmit data state controller 62. In this embodiment, the transmitter data state controller 62 preferably includes a frame byte counter, a byte counter comparator, and a counter sum comparator, such as illustrated in FIG. 6, and preferably receives slot size data from a register. A flag counter 44', e.g., a VFP counter, is preferably connected to the transmit data state controller as illustrated. The apparatus 40' preferably includes a shift register 63 preferably receives the data to be transmitted and is preferably a 32-bit wide first-in first-out ("FIFO") circuit as understood by those skilled in the art. A tag register 64 also receives the input from the shift register 63 and tags the lines for an end of packet designation and communicates the tagged information to the transmitter data state controller 62. A multiplexer (MUX) 66 is connected to the shift register 63 for multiplexing the data therefrom. The multiplexer 66 is connected to an inverting circuit 67 which inverts the data prior to transfer of the data to a CRC generator 68 which generates CRC data for the frame.

The apparatus 40' preferably also has a data selector multiplexer 71 which is connected to the CRC generator 68 and a flag pattern generator 69 for selectively multiplexing data generated therefrom. The flag pattern generator is also connected to the transmitter data state controller 62 and preferably generates the desired flag pattern for the VFP scheme to maintain the desired slot size. The data selector multiplexor 71 is also connected to a zero bit insert multiplexor 72 which receives data from the data selector multiplexor and a zero-bit-insert 5-ones counter 73 and multiplexes the data therefrom. The zero-bit-insert 5-ones counter 73 is also preferably connected to the transmitter data state controller 62 so that zero bits which are to be inserted or stuffed in the frame can be counted. Another inverting circuit 75 is also preferably connected to the zero bit insert multiplexor 72 to thereby invert data received therefrom prior to transmission across the network as desired.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed:

1. A method of controlling data flow of data communications in a network, the method comprising the steps of:
    (a) recording a minimum frame slot number for data;
    (b) providing a byte counter and a flag counter;
    (c) transmitting at least one byte of data from a frame of data within a slot;
    (d) incrementing the byte counter;
    (e) determining if the end of the frame of data occurs;
    (f) if the end of the frame of data does not occur, then transmitting another byte and incrementing the byte counter;
    (g) if the end of the frame of data occurs, then determining whether a number currently represented and stored in the byte counter is less than the minimum frame slot number;
    (h) if the number currently represented and stored in the byte counter is less than the minimum frame slot number, then transmitting a flag byte and incrementing the flag byte counter;
    (i) if the number currently represented and stored in the byte counter is equal or greater than the minimum frame slot number, then resetting the byte and flag counters and repeating steps (c) through (h);
    (j) determining whether the sum of the numbers currently represented and stored in the byte counter and the flag counter equals the minimum frame slot number;
    (k) if the sum does not equal the minimum frame slot number, then transmitting another flag byte and incrementing the flag counter; and
    (l) if the sum equals the minimum frame slot, then resetting the byte and flag counters to an initial setting and transmitting at least another byte of data of another frame.

2. A method as defined in claim 1, further comprising dynamically varying the minimum frame slot number.

3. A method as defined in claim 1, further comprising verifying the minimum frame slot number after recorded.

4. A method as defined in claim 1, wherein prior to the transmitting step the method further comprising determining that a transmit queue is ready for transmit and receiving notification to transmit a frame prior to transmitting the at least one byte of data thereof.

5. A method as defined in claim 4, wherein the steps of determining that a transmit queue is ready and receiving notification to transmit also occur prior to the step of transmitting at least another byte of data from another frame as set forth in step (1).

6. A method as defined in claim 1, wherein the step of providing of the byte counter and the flag counter includes initially setting each of the byte and flag counters to an initial setting.

7. A method as defined in claim 6, wherein the initial setting and resetting of the byte and flag counters are both set to a number representing zero.

8. A method as defined in claim 1, further comprising repeating steps (d) through (l) after step (l) until all desired transmission is complete.

9. A method of controlling data flow of data communications in a network, the method comprising the steps of:
    (a) transmitting at least one byte of data from a frame of data within a frame slot;
    (b) incrementing a byte counter from a current setting;
    (c) if an end of the frame of data does not occur, then repeat steps (a) and (b) for the frame;
    (d) if an end of the frame of data occurs, then determining whether a number currently represented and stored in the byte counter is less than a predetermined minimum frame slot number;
    (e) if the number currently represented and stored in the byte counter is less than the predetermined minimum frame slot number, then transmitting a flag byte and incrementing a flag byte counter from a current setting;
    (f) if the number currently represented and stored in the byte counter is equal or greater than the minimum frame slot number, then resetting the byte and flag counters and repeating steps (a) through (e);
    (g) if the sum of the numbers currently represented and stored in the byte and flag counters does not equal the predetermined minimum frame slot number, then repeat steps (e) and (f); and
    (h) if the sum of the numbers currently represented and stored in the byte and flag counters equals the predetermined minimum frame slot number, then resetting the byte and flag counters to an initial setting and repeat steps (a) and (b) for another frame of data.

10. A method as defined in claim 9, further comprising dynamically varying the predetermined minimum frame slot number.

11. A method as defined in claim 10, further comprising recording a minimum frame slot number and verifying the minimum frame slot number after recorded.

12. A method as defined in claim 11, wherein prior to the transmitting step the method further comprising determining that a transmit queue is ready for transmit and receiving notification to transmit a frame prior to transmitting the at least one byte of data thereof.

13. A method as defined in claim 12, wherein the steps of determining that a transmit queue is ready and receiving notification to transmit also occur prior to the step of transmitting at least another byte of data from another frame as set forth in step (l).

14. A method as defined in claim 13, further comprising the steps of providing of the byte counter and the flag counter and initially setting each of the byte and flag counters to an initial setting.

15. A method as defined in claim 14, wherein the initial setting and resetting of the byte and flag counters are both set to a number representing zero.

16. A method as defined in claim 15, further comprising repeating steps (a) through (g) after step (h) until all desired transmission is complete.

17. A method of controlling data flow of data communications in a network, the method comprising the steps of:
dynamically varying a minimum frame slot number; and
transmitting at least bytes of data from a frame of data of a slot having the dynamically varying minimum frame slot number;
determining the end of the frame of data;
determining that the number of bytes of data within the frame is less than the current minimum frame slot number; and
transmitting flag bytes within the slot until the combination of the number of bytes and flag bytes equals the current minimum frame slot number.

18. A method as defined in claim 17, further comprising recording the minimum frame slot number and verifying the minimum frame slot number after recorded.

19. A method as defined in claim 17, wherein prior to the transmitting step the method further comprises determining that a transmit queue is ready for transmit and receiving notification to transmit a frame prior to transmitting the at least one byte of data thereof.

20. A method as defined in claim 19, wherein the steps of determining that a transmit queue is ready and receiving notification to transmit also occur prior to the step of transmitting at least another byte of data from another frame.

21. A method as defined in claim 17, further comprising the steps of providing of a byte counter and a flag counter and initially setting each of the byte and flag counters to an initial setting.

22. A method as defined in claim 21, wherein the initial setting and resetting of the byte and flag counters are both set to a number representing zero.

23. A method as defined in claim 17, further comprising repeating steps (a) through (e) after step (e) until all desired transmission is complete.

24. An apparatus for network data communications, the apparatus comprising:
a transmitter positioned to transmit at least bytes of frames of data of a data slot;
a byte counter responsive to said transmitter to count the number of bytes in a frame of transmitted data;
a flag counter responsive to said transmitter to count the number of flag bytes transmitted within a frame of transmitted data;
a byte counter comparator responsive to said byte counter to compare the number of bytes transmitted in each frame of data with a predetermined minimum frame slot number; and
a counter sum comparator responsive to said byte and flag counters for comparing the sum of the number in said byte counter and the number in said flag counter with the predetermined frame slot number.

25. An apparatus as defined in claim 24, further comprising a frame slot recorder for recording a minimum frame slot number for each desired slot size of data to be transmitted and a frame slot verifier responsive to the frame slot recorder for verifying the minimum frame slot number for each desire slot size.

26. An apparatus as defined in claim 24, further comprising a transmit notification confirmer for confirming receipt of notification to transmit a frame of data.

27. An apparatus as defined in claim 24, further comprising a transmit queue confirmer for confirming a ready status of a transmit queue.

28. An apparatus as defined in claim 24, further comprising an end of frame determiner responsive to said transmitter for determining the end of a frame of data, and wherein said byte counter comparator is further responsive to said end of frame determiner.

29. An apparatus for network data communications, the apparatus comprising:
transmitting means for transmitting at least bytes of frames of data of a data slot;
byte counting means responsive to said transmitting means for counting the number of bytes in a frame of transmitted data;
flag counting means responsive to said transmitting means for counting the number of flag bytes transmitted within a frame of transmitted data;
byte counter comparing means responsive to said byte counter for comparing the number of bytes transmitted in each frame of data with a predetermined minimum frame slot number; and
counter sum comparing means for comparing the sum of the number in said byte counter and the number in said flag counter with the predetermined minimum frame slot number.

30. An apparatus as defined in claim 29, further comprising a frame slot recorder for recording a minimum frame slot number for each desired slot size of data to be transmitted and a frame slot verifier responsive to the frame slot recorder for verifying the minimum frame slot number for each desire slot size.

31. An apparatus as defined in claim 30, further comprising a transmit notification confirmer for confirming receipt of notification to transmit a frame of data.

32. An apparatus as defined in claim 31, further comprising a transmit queue confirmer for confirming a ready status of a transmit queue.

33. An apparatus as defined in claim 32, further comprising an end of frame determiner responsive to said transmitting means for determining the end of a frame of data, and wherein said byte counter comparing means is further responsive to said end of frame determiner.

34. An apparatus for network data communications, the apparatus comprising:
transmitting means for transmitting at least bytes of frames of data of a data slot;
counting means responsive to said transmitting means for counting the number of bytes and the number of flag bytes in a frame of a data slot of transmitted data; and comparing means responsive to said counting means for comparing the number of bytes transmitted in each frame of data with a predetermined minimum frame slot number and for comparing the sum of the number of bytes and the number of flag bytes in said counting means with a predetermined minimum frame slot number.

35. An apparatus as defined in claim 34, further comprising a frame slot recorder for recording a minimum frame slot number for each desired slot size of data to be transmitted and a frame slot verifier responsive to the frame slot recorder for verifying the minimum frame slot number for each desire slot size.

36. An apparatus as defined in claim 34, further comprising a transmit notification confirmer for confirming receipt of notification to transmit a frame of data.

37. An apparatus as defined in claim 34, further comprising a transmit queue confirmer for confirming a ready status of a transmit queue.

* * * * *